(12) United States Patent
Kelter

(10) Patent No.: US 9,232,269 B2
(45) Date of Patent: Jan. 5, 2016

(54) ENHANCED INTERACTIVE TELEVISION

(75) Inventor: Robert Samuel Kelter, Peoria, AZ (US)

(73) Assignee: Cox Communications, Inc., Atlanta, GA (US)

( * ) Notice: Subject to any disclaimer, the term of this patent is extended or adjusted under 35 U.S.C. 154(b) by 1027 days.

(21) Appl. No.: 12/692,093

(22) Filed: Jan. 22, 2010

(65) Prior Publication Data
US 2011/0185383 A1 Jul. 28, 2011

(51) Int. Cl.
| | |
|---|---|
| H04N 7/10 | (2006.01) |
| H04N 21/442 | (2011.01) |
| H04N 21/81 | (2011.01) |
| H04H 20/38 | (2008.01) |
| H04H 20/78 | (2008.01) |
| H04H 60/31 | (2008.01) |
| H04H 60/46 | (2008.01) |
| H04H 60/66 | (2008.01) |
| H04N 21/433 | (2011.01) |
| H04N 21/472 | (2011.01) |
| H04N 21/4722 | (2011.01) |
| H04N 21/658 | (2011.01) |
| H04N 21/8549 | (2011.01) |
| H04H 60/40 | (2008.01) |
| H04H 60/43 | (2008.01) |

(52) U.S. Cl.
CPC ......... *H04N 21/44222* (2013.01); *H04H 20/38* (2013.01); *H04H 20/78* (2013.01); *H04H 60/31* (2013.01); *H04H 60/46* (2013.01); *H04H 60/66* (2013.01); *H04N 21/4334* (2013.01); *H04N 21/4722* (2013.01); *H04N 21/47214* (2013.01); *H04N 21/6582* (2013.01); *H04N 21/812* (2013.01); *H04N 21/8549* (2013.01); *H04H 60/40* (2013.01); *H04H 60/43* (2013.01)

(58) Field of Classification Search
CPC ....................................................... H04N 21/81
USPC ........................................... 725/9–14, 32–34
See application file for complete search history.

(56) References Cited

U.S. PATENT DOCUMENTS

| | | | | |
|---|---|---|---|---|
| 5,382,970 | A * | 1/1995 | Kiefl | 455/2.01 |
| 5,699,107 | A * | 12/1997 | Lawler et al. | 725/58 |
| 7,086,075 | B2 * | 8/2006 | Swix et al. | 725/10 |
| 7,159,232 | B1 * | 1/2007 | Blackketter et al. | 725/38 |
| 8,494,907 | B2 * | 7/2013 | Lerman et al. | 705/14.73 |
| 2004/0010806 | A1 * | 1/2004 | Yuen et al. | 725/136 |
| 2004/0073924 | A1 * | 4/2004 | Pendakur | 725/35 |

(Continued)

OTHER PUBLICATIONS

"Macrovision's TV Guide and Sunflower Broadband Collaborate on Set-Top Box Clickstream Measurement," Business Wire, May 18, 2008, http://findarticles.com/p/articles/mi_m0EIN/is_2008_May_18/ai_n25432614/.

*Primary Examiner* — Olugbenga Idowu
(74) *Attorney, Agent, or Firm* — Benjamin A. Balser; Balser & Grell IP Law

(57) ABSTRACT

Interactive programming advertising methods and systems are provided. A selectable menu may be provided with a broadcast programming advertisement. The selectable menu may include one or more selectable functions that may allow for a user to interact with the broadcast programming advertisement. Data regarding the user's interaction or non-interaction with the interactive programming advertisement may be collected and utilized for providing a user with a more customized television viewing experience, for targeted programming advertisements, for measurement of new viewer generation data, as well as for other marketing activities directed to the user.

19 Claims, 3 Drawing Sheets

(56) References Cited

U.S. PATENT DOCUMENTS

| | | | |
|---|---|---|---|
| 2004/0221308 A1* | 11/2004 | Cuttner et al. | 725/46 |
| 2005/0071863 A1* | 3/2005 | Matz et al. | 725/35 |
| 2006/0075420 A1* | 4/2006 | Ludvig et al. | 725/14 |
| 2006/0294547 A1* | 12/2006 | Bon et al. | 725/46 |
| 2007/0079333 A1* | 4/2007 | Murakami et al. | 725/46 |
| 2007/0192796 A1* | 8/2007 | Iwabuchi et al. | 725/46 |
| 2009/0228910 A1* | 9/2009 | Christinat et al. | 725/11 |

* cited by examiner

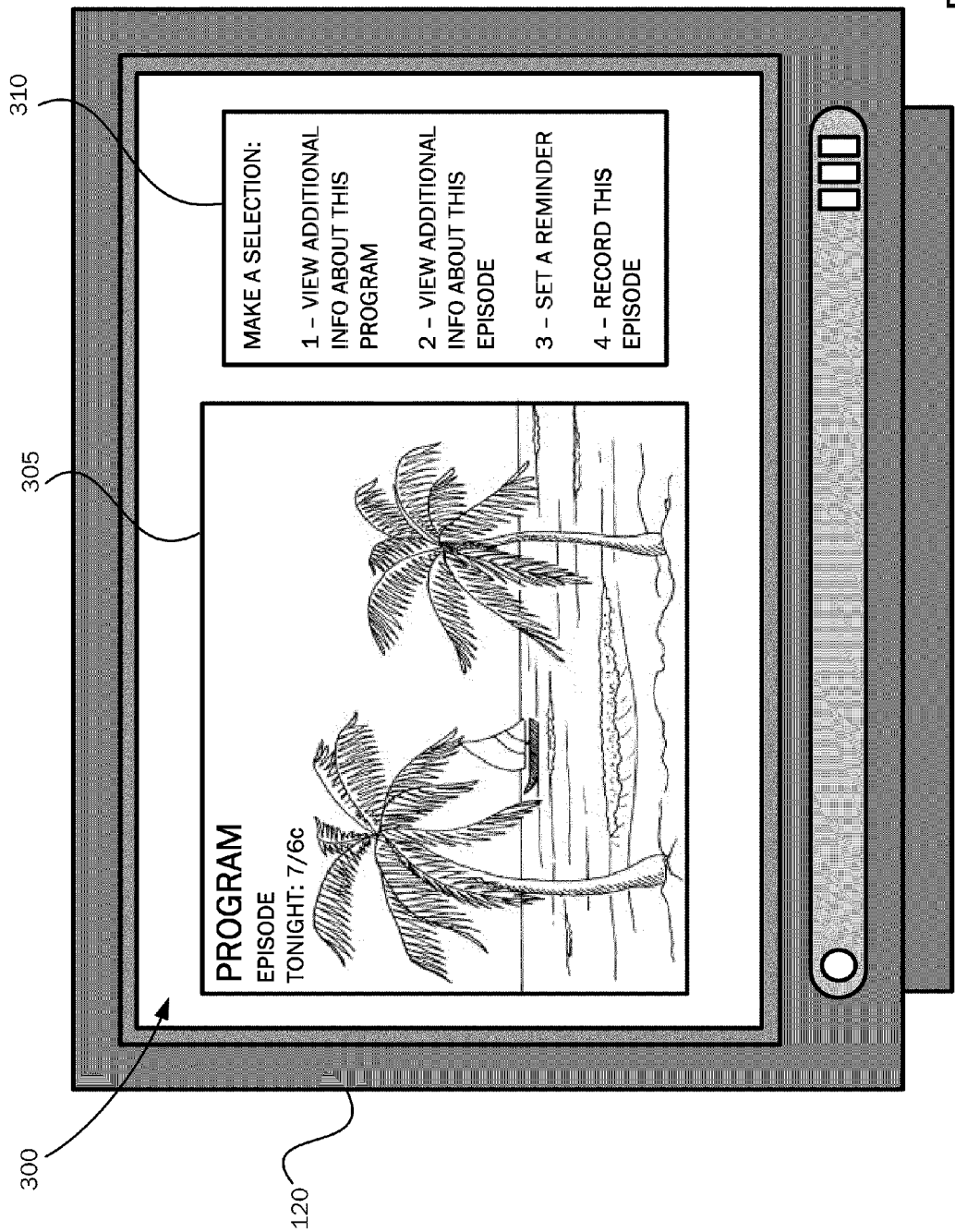

ENHANCED INTERACTIVE TELEVISION

BACKGROUND

By converging interactive technology and television, "interactive television" (iTV) has become an increasingly popular communicative technology which allows an exchange of information between a viewer and a receiver (e.g., service provider, broadcaster, etc.). Viewers may utilize iTV for a variety of interactive services. For example, a user may alter his/her television viewing experience by choosing a camera angle to watch a sporting event, or by returning information to a broadcaster (e.g., choose or influence plot details and/or an ending of a show, voting, commenting, etc.). In addition, viewers may utilize iTV for commerce, in which he/she may convert a sales transaction through a television or Internet access.

Another popular interactive technology is interactive program guides (iPG). Current iPG technology allows viewers to navigate through an iPG on a receiving device (e.g., TV), where he/she may be able to see more information about a current program and/or about upcoming programs. If a viewer has a content recording device, such as a digital video recorder (DVR), he/she may plan his/her viewing by recording programs to a hard disc drive for later viewing. Video on Demand (VoD) functionality may also be provided, whereby a user may buy or select a movie or television program to either play at that time or record to view at a later time.

While these systems provide a variety of interactive features, current systems do not converge iTV and iPG functionalities to provide a better interactive programming advertisement system.

SUMMARY

Consistent with embodiments of the present invention, systems and methods are disclosed for providing interactive programming advertising. According to embodiments, interactive programming advertising may allow a viewer to respond to a programming advertisement (e.g., an advertisement for an upcoming television episode). A viewer response may be a request for more information, to set a reminder for an upcoming television program, to record an upcoming television program, as well as other interactive responses. Usage data may also be gathered and utilized to provide a viewer with a more customized television viewing experience, as well as for enhanced marketing activities.

The details of one or more embodiments are set forth in the accompanying drawings and description below. Other features and advantages will be apparent from a reading of the following detailed description and a review of the associated drawings. It is to be understood that the following detailed description is explanatory only and is not restrictive of the invention as claimed.

BRIEF DESCRIPTION THE DRAWINGS

FIG. 3 is an example user interface of an interactive programming advertisement.

DETAILED DESCRIPTION

Figure 1:
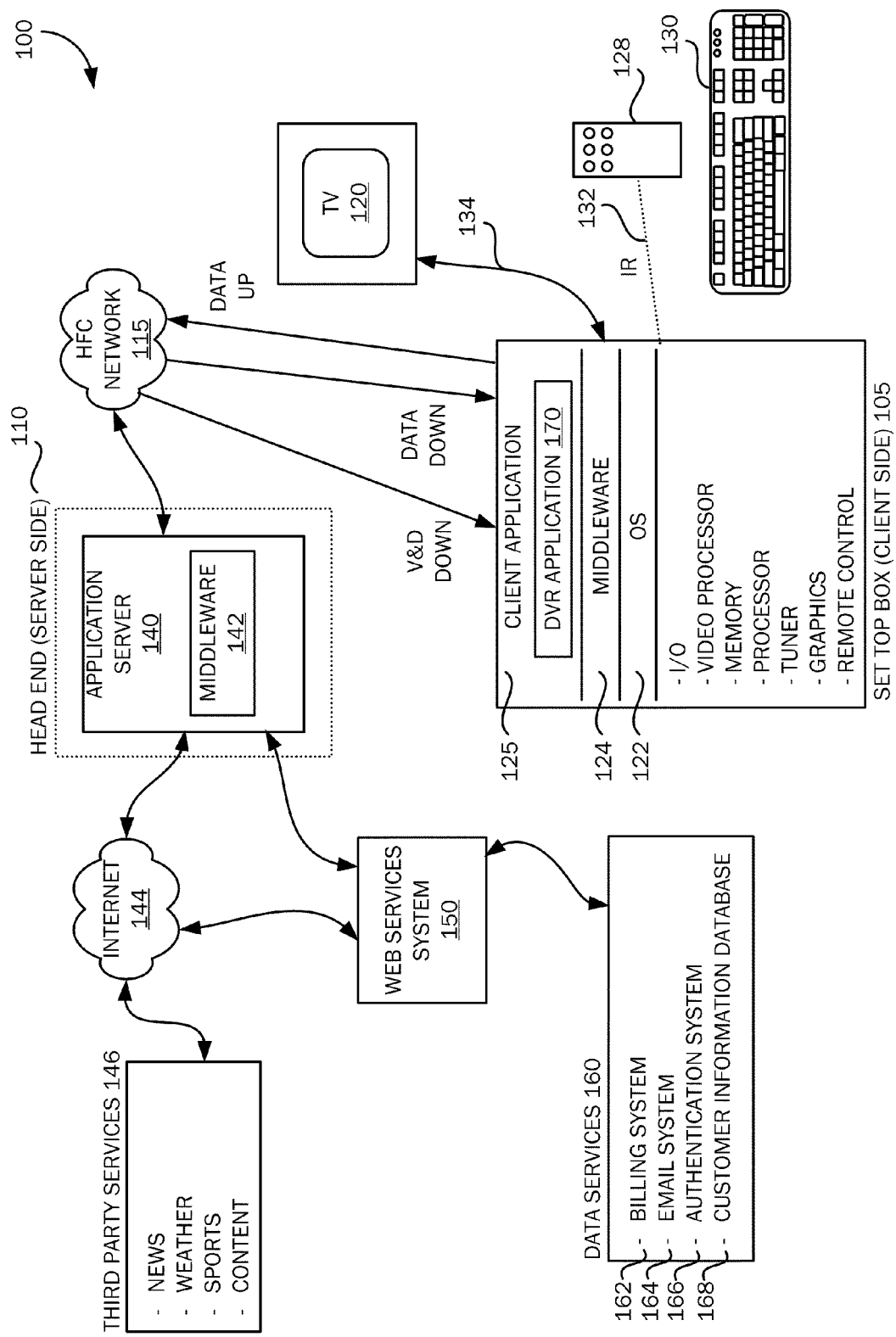
FIG. 1 is a simplified block diagram illustrating a cable television/services system (CATV) architecture that serves as an exemplary operating environment for the present invention.

As briefly described above, embodiments of the present invention are directed to systems and methods for providing interactive programming advertising. As will be described below, according to embodiments, a viewer may be able to provide a response to a programming advertisement. For example, consider a viewer who may be watching a television program and an advertisement for an upcoming television program is shown. The viewer may have an interest in the upcoming television program. The viewer may have never seen the television program before, or alternatively may be a regular viewer. In either case, a selectable menu may be provided, providing the viewer with a variety of selections, such as recording the upcoming program, setting an alert to inform the viewer of when the program is starting, requesting more information about the upcoming program, as well as other selectable options.

An interactive programming advertisement (IPA) system may provide various benefits, such as providing viewers with an easy way to view new programming without having to go through a program guide, generating viewers for programming that they may have an interest in, and gaining more viewers for networks.

These embodiments may be combined, other embodiments may be utilized, and structural changes may be made without departing from the spirit or scope of the present invention. The following detailed description is therefore not to be taken in a limiting sense, and the scope of the present invention is defined by the appended claims and their equivalents. Referring now to the drawings, in which like numerals refer to like elements throughout the several figures, embodiments of the present invention and an exemplary operating environment will be described.

The following describes a simplified block diagram illustrating a cable television/services system (hereafter referred to as "CATV") architecture that serves as an exemplary operating environment for the interactive programming advertisement methods and systems of the present invention. It should be appreciated, however, that although the present invention is described in the context of a CATV system, embodiments herein may also apply to satellite telecasting systems, as well as other systems that are suitable for providing television services to viewers. Referring now to FIG. 1, digital and analog video programming, information content and interactive television services are provided via a hybrid fiber coax (HFC) network 115 to a television set 120 for consumption by a cable television/services system customer. As is known to those skilled in the art, HFC networks 115 combine both optical fiber and coaxial cable lines. Typically, optical fiber runs from the cable head end 110 to neighborhoods of 500 to 2,000 customers. Coaxial cable runs from the optical fiber feeders to each customer. According to embodiments of the present invention, the functionality of the HFC network 115 allows for efficient bidirectional data flow between the client-side set-top box 105 and the server-side application server 140 of the present invention.

According to embodiments of the present invention, the CATV system 100 is in the form of a distributed client-server computing system for providing video and data flow across the HFC network 115 between server-side services providers (e.g., cable television/services providers) via a server-side (backend) head end 110 and a client-side customer via a client-side set-top box (STB) functionally connected to a customer receiving device, such as the television set 120. As is understood by those skilled in the art, modern CATV systems 100 may provide a variety of services across the HFC network 115 including traditional digital and analog video programming, telephone services, high speed Internet access, video-on-demand, and information services.

On the client side of the CATV system 100, digital and analog video programming and digital and analog data are provided to the customer television set 120 via the set-top box (STB) 105. Interactive television services that allow a customer to input data to the CATV system 100 likewise are provided by the STB 105. As illustrated in FIG. 1, the STB 105 is a multipurpose computing device having a computer processor, memory and an input/output mechanism. A digital video recorder (DVR) may be integrated into a STB 105 or may be a discrete unit. A DVR may be described as an electronic device having a storage medium capable of storing media signals in a digital format. The storage medium is commonly a non-volatile storage device such as a hard disk drive. The size/capacity of the hard disk drive is a determining factor of how much data can be recorded. A STB 105 may comprise a DVR application 170 which may enable DVR functionality to capture, record, and play back content from a HDD. The input/output mechanism of a STB 105 receives input from server-side processes via the HFC network 115 and from customers via input devices such as the remote control device 128 and the keyboard 130. The remote control device 128 and the keyboard 130 may communicate with the STB 105 via a suitable communication transport such as the infrared connection 132. The STB 105 also includes a video processor for processing and providing digital and analog video signaling to the television set 120 via a cable communication transport 134. A multi-channel tuner is provided for processing video and data to and from the STB 105 and the server-side head end system 110, described below.

The STB 105 also includes an operating system 122 for directing the functions of the STB 105 in conjunction with a variety of client applications 125. For example, if a client application 125 requires a news flash from a third-party news source to be displayed on the television 120, the operating system 122 may cause the graphics functionality and video processor of the STB 105, for example, to output the news flash to the television 120 at the direction of the client application 125 responsible for displaying news items.

Because a variety of different operating systems 122 may be utilized by a variety of different brands and types of set-top boxes, a middleware layer 124 is provided to allow a given software application to be executed by a variety of different operating systems. According to an embodiment of the present invention, the middleware layer 124 may include a set of application programming interfaces (API) that are exposed to client applications 126 and operating systems 122 that allow the client applications to communicate with the operating systems through common data calls understood via the API set. As described below, a corresponding middleware layer is included on the server side of the CATV system 100 for facilitating communication between the server-side application server 140 and the client-side STB 105. According to one embodiment of the present invention, the middleware layer 142 of the server-side application server 140 and the middleware layer 124 of the client-side STB 105 format data passed between the client side and server side according to the Extensible Markup Language (XML). As should be appreciated by those skilled in the art, although some embodiments described in this specification are oriented to middleware installed and executed on a STB 105, alternative embodiments implemented as firmware or as hardware are well within the scope of the present invention.

The set-top box 105 passes digital and analog video and data signaling to the television 120 via a one-way communication transport 134. The STB 105 may receive video and data from the server side of the CATV system 100 via the HFC network 115 through a video/data downlink and data via a data downlink. The STB 105 may transmit data from the client side of the CATV system 100 to the server side of the CATV system 100 via the HFC network 115 via one data uplink. The video/data downlink is an "in band" downlink that allows for digital and analog video and data signaling from the server side of the CATV system 100 through the HFC network 115 to the set-top box 105 for use by the STB 105 and for distribution to the television set 120. As is understood by those skilled in the art, the "in band" signaling space operates at a frequency between 54 and 860 megahertz. The signaling space between 54 and 860 megahertz is generally divided into 6 megahertz channels in which may be transmitted a single analog signal or a greater number (e.g., up to ten) digital signals.

The data downlink and the data uplink, illustrated in FIG. 1, between the HFC network 115 and the set-top box 105 comprise "out of band" data links. As is understand by those skilled in the art, the "out of band" frequency range generally lies between zero and 54 megahertz. According to embodiments of the present invention, data flow between the client-side set-top box 105 and the server-side application server 140 is typically passed through the "out of band" data links. Alternatively, an "in band" data carousel may be positioned in an "in band" channel into which a data feed may be processed from the server-side application server 140 through the HFC network 115 to the client-side STB 105. Operation of data transport between components of the CATV system 100, described with reference to FIG. 1, is well known to those skilled in the art.

Referring still to FIG. 1, the head end 110 of the CATV system 100 is positioned on the server side of the CATV system and includes hardware and software systems responsible for originating and managing content for distributing through the HFC network 115 to client-side STBs 105 for presentation to customers via televisions 120. As described above, a number of services may be provided by the CATV system 100, including digital and analog video programming, interactive television services, telephone services, video-on-demand services, targeted advertising, and provision of information content.

The application server 140 is a general-purpose computing system operative to assemble and manage data sent to and received from the client-side set-top box 105 via the HFC network 115. As described above with reference to the set-top box 105, the application server 140 includes a middleware layer 142 for processing and preparing data from the head end of the CATV system 100 for receipt and use by the client-side set-top box 105. For example, the application server 140 via the middleware layer 142 may obtain data from third-party services 146 via the Internet 144 for transmitting to a customer through the HFC network 115 and the set-top box 105. For example, a weather report from a third-party weather service may be downloaded by the application server via the Internet 144. When the application server 140 receives the downloaded weather report, the middleware layer 142 may be utilized to format the weather report for receipt and use by the set-top box 105. According to one embodiment of the present invention, data obtained and managed by the middleware layer 142 of the application server 140 is formatted according to the Extensible Markup Language and is passed to the set-top box 105 through the HFC network 115 where the XML-formatted data may be utilized by a client application 126 in concert with the middleware layer 124, as described above. As should be appreciated by those skilled in the art, a variety of third-party services data, including news data, weather data, sports data and other information content, may be obtained by the application server 140 via distributed computing environments such as the Internet 144 for provision to customers via the HFC network 115 and the set-top box 105.

According to embodiments of the present invention, the application server 140 obtains customer profile data from services provider data services 160 for preparing a customer profile that may be utilized by the set-top box 105 for tailoring certain content provided to the customer and for pre-populating product/services order forms and customer lead generation forms. As illustrated in FIG. 1, the services provider data services 160 include a number of services operated by the services provider of the CATV system 100 which may include data on a given customer. For example, a billing system 162 may include information such as a customer's name, street address, business identification number, Social Security number, credit history, and information regarding services and products subscribed to by the customer. An electronic mail system 164 may contain information such as electronic mail addresses, high-speed Internet access subscription information and electronic mail usage data. An authentication system 166 may include information such as secure user names and passwords utilized by customers for access to network services.

The customer information database 168 may include general information about customers such as place of employment, business address, business telephone number and demographic information such as age, gender, educational level, and the like. The customer information database may also include information on products and services subscribed to by a customer from her cable services provider. For example, in accordance with embodiments of the present invention, the customer information database may contain data to allow a determination as to whether a particular product or service is already provisioned at a customer service address or whether a work order is pending for a particular product or service provisioning at the customer service address. The customer information database may also include information that allows for a determination as to whether prerequisites for provisioning a requested product of service are met by a requesting customer. For example, if a customer requests electronic mail services and high speed Internet access is a prerequisite for electronic mail services, the customer information database may be queried to determine whether the required Internet access is provisioned at the requesting customer location or address. Also, information collected in association with the interactive programming advertisement system and methods described herein may be stored at the customer information database.

As should be understood by those skilled in the art, the disparate data services systems 162, 164, 166, 168 are illustrated as a collection of data services for purposes of example only. The example data services systems comprising the data services 160 may operate as separate data services systems, which communicate with a web services system (described below) along a number of different communication paths and according to a number of different communication protocols Referring still to FIG. 1, a web services system 150 is illustrated between the application server 140 and the data services 160. According to embodiments of the present invention, the web services system 150 serves as a collection point for data requested from each of the disparate data services systems comprising the data services 160. When the application server 140 requires customer profile data from one or more of the data services 160 for preparation or update of a customer profile, the application server 140 passes a data query to the web services system 150. The web services system formulates a data query to each of the available data services systems for obtaining any available data for a given customer as identified by a set-top box identification associated with the customer. The web services system 150 serves as an abstraction layer between the various data services systems and the application server 140. That is, the application server 140 is not required to communicate with the disparate data services systems, nor is the application server 140 required to understand the data structures or data types utilized by the disparate data services systems. The web services system 150 is operative to communicate with each of the disparate data services systems for obtaining necessary customer profile data. The customer profile data obtained by the web services system is assembled and is returned to the application server 140 for ultimate processing via the middleware layer 142, as described above.

Figure 2:
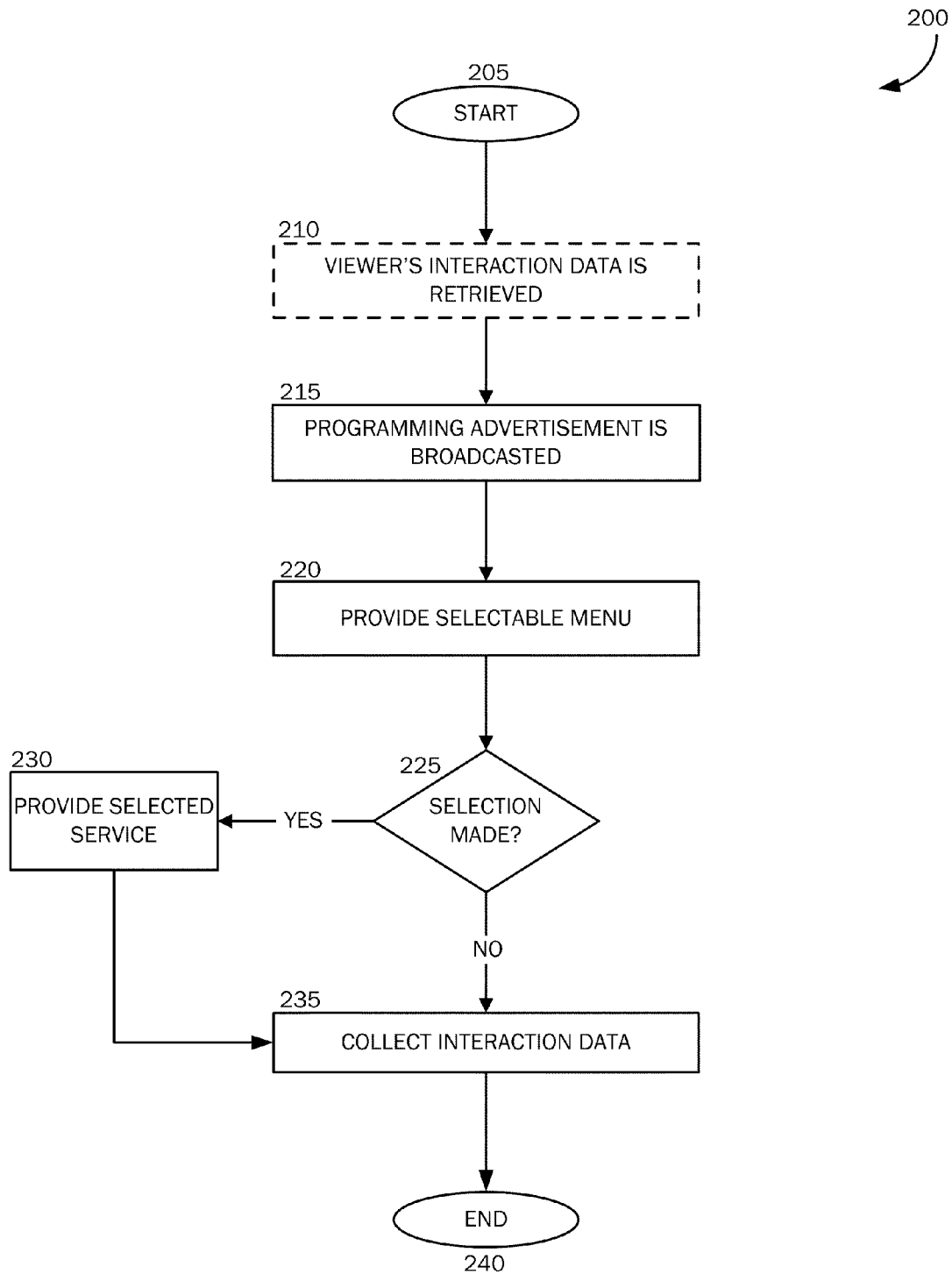
FIG. 2 is a flow diagram of a method 200 for providing interactive programming advertisement.

Having described elements of a CATV architecture 100 that serves as an exemplary operating environment for embodiments of the present invention, FIG. 2 is a flow diagram of a method 200 for providing an IPA system. The method 200 starts at operation 205 and proceeds to operation 210 where, if available, data relative to a user may be retrieved. Retrieved data may include, but is not limited to, customer profile data, preferences data set by a user, feedback data, user viewing behavior (e.g., content watched by a user, DVR behavior, etc.), a user's previous interaction(s) with an interactive feature (e.g., iPG, interactive advertisement, etc.), market segment data associated with a user (e.g., demographics data, geographical data, etc.), or any combination thereof. According to embodiments, various user interactions with a STB may be captured and recorded. According to one embodiment, user interaction data may be collected by a STB. Data may be retrieved, such as metadata (e.g., type of programming watched, viewing times, engagement with interactive services, etc.), data entered by a user (e.g., Favorites, preference data, etc.), as well as other forms of capturable data. Depending on various collected data, the data may be utilized by a broadcaster or service to gain insight on how a user may utilize interactive services, program guides, DVRs, On Demand services and advertising in an effort to develop more effective consumer marketing activities and to provide a more customized viewing experience for its customers. For example, if a viewer has a usage pattern indicative that he/she enjoys watching a particular type of programming, for example reality television programming, programming advertisement for reality television programs may be provided to the viewer. According to embodiments, collected data may be specific to a user profile, to a STB, or a combination thereof.

The method 200 then proceeds to operation 215 where a programming advertisement is broadcast. According to one embodiment, the programming advertisement may be broadcast based on data retrieved in operation 210. For example, if collected user interaction data indicates that a specified user or users associated with a specified STB regularly watch a particular television program, an interactive programming advertisement for the specified program may not be broadcast to the specified STB. However, an interactive programming advertisement for a similar type of program that the user may have an interest in may be broadcast to the specified STB. A programming advertisement may include advertisement for a programming episode, a programming series, and/or an individual program. According to another embodiment, the programming advertisement may not be broadcast based on retrieved data, but based on linear programming.

The method 200 then proceeds to operation 220 where a selectable menu is provided with the broadcast programming advertisement. The selectable menu may include one or more selectable functions that may allow for a user to interact with the broadcast programming advertisement. Selectable functions may include, but are not limited to, viewing scheduling for the advertised programming, viewing more information about the advertised programming, setting a reminder for the advertised programming, setting a DVR recording for the advertised programming, as well as various other interactive functionalities that a viewer may wish to have with a programming advertisement.

The method 200 proceeds to decision operation 225, where a decision is made as to whether or not a selection has been made. If a selection of an interactive function of the broadcast programming advertisement is made, the method proceeds to operation 230 where the selected function is performed or scheduled. For example, if a user is watching TV and sees a programming advertisement for an upcoming episode of a particular programming series, he/she may decide that he/she would like to find out more about the particular episode or series. The user may make a selection indicating that he/she would like to view more information about the particular episode. Upon his/her selection, information about the episode may be provided to the user via the CATV system described above with reference to FIG. 1. He/she may then decide that he/she would like to watch the particular episode. He/she may make a selection indicating that he/she would like to set a reminder for when the particular episode is broadcast. When he/she makes the selection, a reminder may be scheduled to inform the user when the particular episode of interest is broadcast or at a specified amount of time before the episode is broadcast.

If a user selects an interactive feature of an IPA at decision operation 225, and after the selected feature is scheduled or provided in operation 230, or if a user does not select an interactive feature of an IPA at decision operation 225, interaction and/or non-interaction data may be collected and recorded. According to embodiments, based on an interaction or non-interaction a user has in association with an IPA, collected data may be utilized in a variety of ways to enhance a user's television viewing experience and/or to provide for enhanced marketing activities. According to embodiments, collected data may be utilized by a service provider and/or shared with vendors associated with a service provider according to business rules. Data may be stored in a customer's profile, in one or more service provider databases, a plurality of remote databases, locally on a STB, within an IPA system, or any combination thereof. Collecting and analyzing data associated with a user's interaction and/or non-interaction with an IPA, a variety of information may be determined, including but not limited to, if new viewers of a program are generated, if a particular demographic is more responsive to IPAs, if interaction with an IPA is more likely to happen at a particular time, day, season, etc., as well as other discoverable information. As can be appreciated, this information may be strategically utilized in selling commercial time slots to network advertisers.

Referring now to FIG. 3, an example user interface 300 of an IPA is shown. According to embodiments, an IPA may comprise a viewing area 305 in which an advertisement is shown. The advertisement may be a still shot, video, text, or a combination thereof. An IPA may also comprise information about the advertised programming such as a program title, an episode title (if applicable), an airing date and time. As should be appreciated, other information may be provided, including but not limited to, actors names, producer names, a genre of the programming, rating information, etc. An IPA may also comprise a menu 310 with various selections that a user may choose to select, including, but not limited to, viewing additional information about a program, series, or episode, setting a reminder, recording a program, series, or episode, etc. As should be appreciated, the illustrated user interface 300 is an example only; an IPA user interface may vary in design and layout.

Embodiments of the present invention, for example, are described above with reference to block diagrams and/or operational illustrations of methods, systems, and computer program products according to embodiments of the invention. The functions/acts noted in the operations may occur out of the order as shown in any flowchart. For example, two operations shown in succession may in fact be executed substantially concurrently or the operations may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A method for providing interactive programming advertising, the method comprising:
    preparing a user profile;
    selecting an interactive programming advertisement based on the user profile, wherein if user interaction data indicates that a user regularly watches a particular program, an interactive programming advertisement for the particular program is blocked from selection and an interactive programming advertisement for a similar type of program or service is selected;
    broadcasting the selected interactive programming advertisement outside of a program guide based on the user profile;
    providing a selectable menu for selecting a functionality associated with content related to the selected interactive programming advertisement;
    if an interaction with a selection from the selectable menu is received, providing a functionality associated with content related to the selected interactive programming advertisement, collecting data associated with the interaction, and setting an alert to inform the user when the content is starting; and
    if an interaction with a selection from the selectable menu is not received, collecting data associated with the non-interaction.

2. The method of claim 1, wherein an interactive programming advertisement comprises an advertisement for at least one of a product, a service, a programming series, a programming episode, or an individual program.

3. The method of claim 1, wherein a broadcast interactive programming advertisement is broadcast based on collected data, the collected data comprising at least one of customer profile data, preferences data set by the user, feedback data, user viewing behavior, the user's previous interaction with an interactive feature, market segment data associated with the user, electronic mail system data, authentication system data, and billing system data.

4. The method of claim 3, wherein billing data comprises at least one of the user's name, street address, business identification number, social security number, credit history, and information regarding services and products subscribed to by the user.

5. The method of claim 4, wherein viewing data comprises one or more data items related to a channel watched, a network watched, a program watched, an episode watched, a genre of a programming watched, a time a programming is watched, a day a programming is watched.

6. The method of claim 1, wherein user interaction data comprises one or more data items related to user preference data, feedback data, data related to interaction with a digital video recording device, data related to interaction with a programming advertisement, data related to interaction with a product advertisement, data related to interaction with a service advertisement, and data related to interaction with an interactive programming guide.

7. The method of claim 3, wherein collected data comprises demographics data.

8. The method of claim 3, wherein collected data comprises customer profile data.

9. The method of claim 3, wherein collected data is associated with one or more specified users of a set-top box.

10. The method of claim 3, wherein collected data is associated with any user of a specified set-top box.

11. The method of claim 3, wherein collected data is associated with a plurality of users fitting a specified demographic criterion.

12. The method of claim 3, wherein collected data is associated with a plurality of users fitting a specified geographic criterion.

13. The method of claim 1, wherein a selection from a selectable menu comprises viewing additional information about a program, series, or episode, setting a reminder, or recording a program, series, or episode.

14. A system for providing interactive programming advertising, the system comprising:
   an interactive programming advertising system operative
      to prepare a user profile;
      to select an interactive programming advertisement based on the user profile, wherein if user interaction data indicates that a user regularly watches a particular program, an interactive programming advertisement for the particular program is blocked from selection and an interactive programming advertisement for a similar type of program or service is selected;
      to broadcast the selected interactive programming advertisement outside of a program guide based on the user profile;
      to provide a selectable menu for receiving a selection of a functionality associated with content related to the selected interactive programming advertisement;
      if a selection from the selectable menu is received, to provide a functionality associated with the selection, to collect data associated with the selection, and to set an alert to inform the user when the content is starting; and
      if a selection from the selectable menu is not received, to collect data associated with the non-selection.

15. The system of claim 14, wherein an interactive programming advertisement comprises an advertisement for at least one of a programming series, a programming episode, or an individual program.

16. The system of claim 14, wherein a broadcast interactive programming advertisement is broadcast based on collected data.

17. The system of claim 14, wherein collected data comprises one or more data items associated with customer profile data, viewing data, user interaction data, demographics data, or geographical data.

18. A non-transitory computer readable medium containing computer executable instructions which when executed by a computer perform a method of providing an interactive programming advertisement; comprising:
   preparing a customer profile;
   selecting an interactive programming advertisement based on the user profile, wherein if user interaction data indicates that a user regularly watches a particular program, an interactive programming advertisement for the particular program is blocked from selection and an interactive programming advertisement for a similar type of program or service is selected
   broadcasting the selected interactive programming advertisement outside of a program guide based on the customer profile;
   providing a selectable menu;
   if an interaction with a selection from the selectable menu is received, providing a functionality associated with the selection, collecting data associated with the interaction, and setting an alert to inform the user when the content is starting; and
   if an interaction with a selection from the selectable menu is not received, collecting data associated with the non-interaction.

19. The non-transitory computer readable medium of claim 18, wherein an interactive programming advertisement comprises an advertisement for at least one of a programming series, a programming episode, or an individual program.

* * * * *